US010332701B2

(12) United States Patent
Yeh et al.

(10) Patent No.: US 10,332,701 B2
(45) Date of Patent: Jun. 25, 2019

(54) LUMINOUS KEYBOARD

(71) Applicant: Primax Electronics Ltd., Taipei (TW)

(72) Inventors: Tien-Yu Yeh, Taipei (TW); Che-Wei Yang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/865,671

(22) Filed: Jan. 9, 2018

(65) Prior Publication Data

US 2019/0115170 A1 Apr. 18, 2019

(30) Foreign Application Priority Data

Oct. 13, 2017 (TW) ............................ 106135146 A

(51) Int. Cl.
*G01D 11/22* (2006.01)
*H01H 13/83* (2006.01)
*H01H 13/705* (2006.01)
*H01H 3/12* (2006.01)

(52) U.S. Cl.
CPC .......... *H01H 13/83* (2013.01); *H01H 13/705* (2013.01); *H01H 3/125* (2013.01)

(58) Field of Classification Search
CPC ..... H01H 13/83; H01H 13/905; H01H 13/125
See application file for complete search history.

(56) References Cited

U.S. PATENT DOCUMENTS

| | | | | |
|---|---|---|---|---|
| 8,530,768 B2 * | 9/2013 | Hwa | H01H 13/83 200/310 |
| 8,878,086 B2 * | 11/2014 | Chen | H01H 13/83 200/310 |
| 10,032,577 B2 * | 7/2018 | Hsu | H01H 13/83 |
| 2013/0087440 A1 * | 4/2013 | Huang | H01H 3/125 200/314 |
| 2013/0233689 A1 * | 9/2013 | Ng | H01H 13/85 200/5 A |
| 2015/0014136 A1 * | 1/2015 | Liang | H01H 13/83 200/5 A |

* cited by examiner

*Primary Examiner* — Ali Alavi
(74) *Attorney, Agent, or Firm* — Muncy, Geissler, Olds & Lowe, P.C.

(57) ABSTRACT

The present invention provides a luminous keyboard, including: at least one key cap; a support plate; a support component, connected to the key cap and the support plate and capable of guiding the key cap to vertically move relative to the support plate; a thin film circuit board, disposed on the support plate; at least one light emitting component, configured to emit a light ray to the key cap; and a shield, covering the light emitting component, where there is a gap between the shield and the light emitting component, and the shield is provided with a diffraction grating at a position where the light ray passes through the shield.

9 Claims, 5 Drawing Sheets

LUMINOUS KEYBOARD

FIELD OF THE INVENTION

The present invention relates to a keyboard, and particularly, to a luminous keyboard.

BACKGROUND OF THE INVENTION

In modern society, use of electronic products has become an indispensable part in life, and almost everything, such as food, clothing, living, transport, education, and entertainment, is related to the electronic products. Generally, a consumer electronic product is provided with a keyboard. To increase the practicability of the keyboard, a backlight module is usually disposed inside the keyboard, and the backlight module can project generated light rays to key caps of the keyboard, to enable a user to operate the keyboard in a dimly lit environment. On the other hand, the backlight module can also be used to implement a keyboard prompting function.

In existing keyboard backlight technologies, a layer of a light guide plate structure may be disposed below a support plate of a keyboard, and corresponding light transmitting holes are disposed at positions of keys. In this way, light rays in the light guide plate may be obtained through the light transmitting holes and further projected to key caps of the keyboard, so that the keyboard produces an obvious highlight display effect. Alternatively, one or more light emitting components may be disposed in a particular area below a keyboard, and the light emitting component directly projects generated light rays to key caps of the keyboard. In the conventional technology, light emitting components are mainly light emitting diodes (LEDs). Because most of light rays emitted from an LED are concentrated around an optical axis, the LED is usually considered to be a point light source. However, when an LED is at a short distance from a key cap, because light rays emitted from the LED are excessively concentrated, the light rays emitted from the LED cannot be effectively spread to the entire key cap. Consequently, a phenomenon of the uneven brightness occurs on a surface of the key cap. Further, if light rays emitted from an LED are excessively strong, a notable bright spot may be generated on a surface of a key cap, making it difficult for a user to recognize a character symbol of the key cap, leading to inconvenience in use.

Therefore, how to improve the brightness of light emission, the irradiation angle, and the evenness of light emergence of a light emitting module is a technical problem to be resolved by the present invention.

SUMMARY OF THE INVENTION

A main objective of the present invention is to provide a luminous keyboard, including a light emitting module capable of adjusting an irradiation range according to character symbols of different key caps, so as to improve recognizability of a character symbol of each key cap.

To achieve the foregoing objective, the present invention provides a luminous keyboard, including:

at least one key cap;

a support plate;

a support component, connected to the key cap and the support plate and capable of guiding the key cap to vertically move relative to the support plate;

a thin film circuit board, disposed on the support plate;

at least one light emitting component, configured to emit a light ray to the at least one key cap; and a shield, covering the at least one light emitting component, where there is a gap between the shield and the at least one light emitting component, and the shield is provided with a diffraction grating at a position where the light ray passes through the shield.

In the foregoing preferred implementation, the shield includes: a light emergence part, a sidewall part, a fixing part, and an accommodation space.

In the foregoing preferred implementation, the light emergence part includes a first surface and a second surface opposite to the first surface.

In the foregoing preferred implementation, an ink layer is formed on the first surface or the second surface, and the ink layer includes a plurality of slits to form the diffraction grating, and the diffraction grating is configured to adjust an irradiation range of the light ray.

In the foregoing preferred implementation, the light emergence part includes a plurality of slits, the slits run through the first surface and the second surface to form the diffraction grating, and the diffraction grating is configured to adjust an irradiation range of the light ray.

In the foregoing preferred implementation, the fixing part is configured to fix the shield to the thin film circuit board.

In the foregoing preferred implementation, the accommodation space is configured to accommodate the light emitting component, and a volume of the accommodation space is larger than a volume of the light emitting component, so that the gap is formed.

In the foregoing preferred implementation, the light emitting component is an LED chip or an electro luminescence (EL) chip.

In the foregoing preferred implementation, the shield is made of polyethylene terephthalate (PET) or a reflector material.

DETAILED DESCRIPTION OF THE PREFERRED EMBODIMENT

The advantages and features of the present invention and the method for implementing the same are more readily understood with reference to the following more detailed description of exemplary embodiments and accompanying drawings. However, the present invention may be implemented in different forms, and should not be understood as being limited to the embodiments described herein. Rather, for persons of ordinary skill in the art, these embodiments are provided so that this disclosure will be more thorough and comprehensive, and will fully convey the concept of the present invention.

Figure 1:
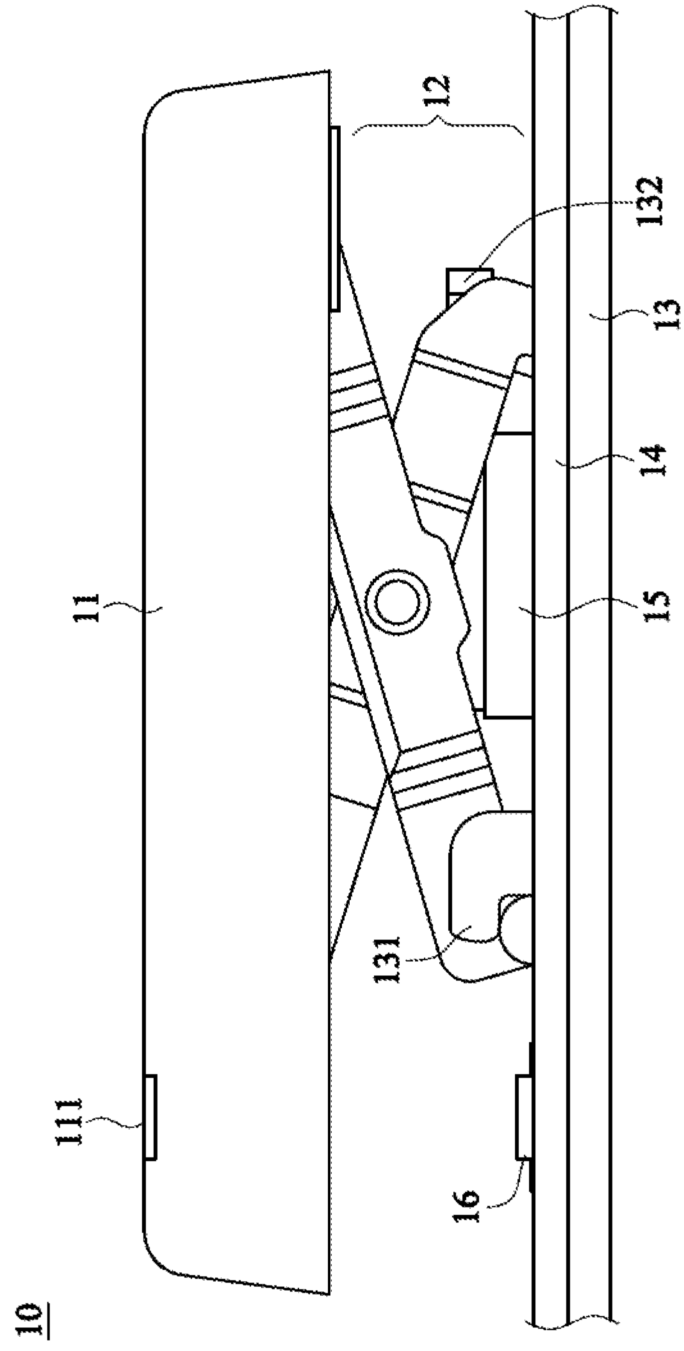
FIG. 1 is a top view of a luminous keyboard according to the present invention.

First, referring to FIG. 1, FIG. 1 is a top view of a luminous keyboard according to the present invention. In FIG. 1, a luminous keyboard 10 includes a key cap 11, a support component 12, a support plate 13, a thin film circuit board 14, an elastic component 15, and a light emitting module 16. The elastic component 15 is disposed below a key cap 11. The support component 12 is a scissors foot structure, is configured to connect the key cap 11 and the support plate 13, and surrounds the elastic component 15. The light emitting module 16 is disposed above the thin film circuit board 14 and is configured to project a light ray to the key cap 11 or a character symbol area 111 on a surface of the key cap 11, so that the surface or the character symbol area 111 of the key cap 11 produces a light emitting visual effect.

Still referring to FIG. 1, the support plate 13 includes joint parts 131 and 132, the thin film circuit board 14 is disposed above the support plate 13, and the joint parts 131 and 132 of the support plate 13 may be disposed in openings (not shown) of the thin film circuit board 14 in a penetrating manner When the keyboard is assembled, one end of the support component 12 may be pivotally connected to the key cap 11 (not shown), the other end of the support component 12 is pivotally connected to the joint parts 131 and 132 of the support plate 13. In this way, the support component 12 is rotatably connected between the key cap 11 and the support plate 13, so as to actuate and guide the key cap 11 to perform descending and ascending actions relative to the support plate 13. Moreover, when the key cap 11 is pressed and descends, the elastic component 15 disposed below the key cap 11 deforms because of being extruded by the key cap 11, and at this moment, a key switch (not shown) on the thin film circuit board 14 is triggered by the elastic component 15 and further outputs a corresponding key signal. Further, when the key cap 11 is not pressed, the elastic component 15 provides an upward elastic returning force for the key cap 11, so as to push the key cap 11 upward and return to its original position. The elastic component 15 made be made of rubber, silica gel, or a metal dome. On the other hand, although the present invention provides only the implementation that the support component 12 is a scissors foot structure, during actual application, the support component 12 may alternatively be replaced with another support component having a similar function such as a V-type structure, an A-type structure, or two parallel link rod structures, and is not limited to the implementations provided in the present invention.

Figure 2:
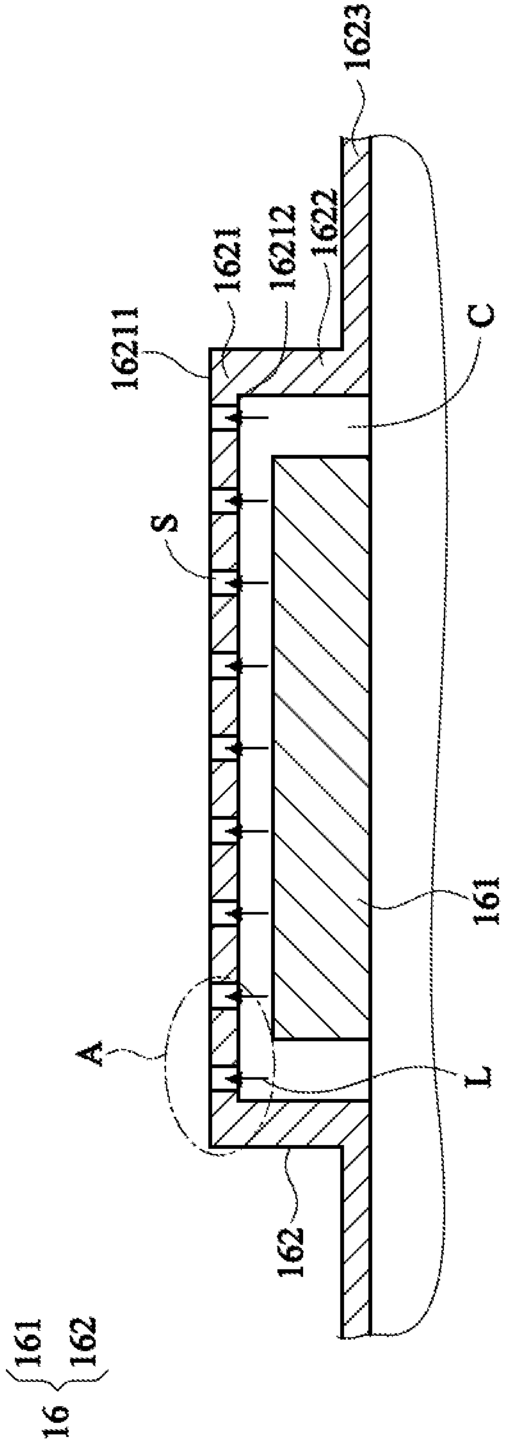
FIG. 2 is a sectional view of a structure of a light emitting module.

Referring to FIG. 2, FIG. 2 is a sectional view of a structure of a light emitting module. In FIG. 2, the light emitting module 16 includes a light emitting component 161 and a shield 162. The light emitting component 161 may be an LED chip or an EL chip, and can emit a light ray L by means of application of a current. The shield 162 includes: a light emergence part 1621, a sidewall part 1622, a fixing part 1623, and an accommodation space C constituted by the light emergence part 1621 and the sidewall part 1622.

The shield 162 is configured to cover the light emitting component 161 and accommodate the light emitting component 161 by means of the accommodation space C. Further, the fixing part 1623 may be configured to fix the shield 162 onto the thin film circuit board 14. In addition, because a volume of the accommodation space C is larger than a volume of the light emitting component 161, a gap may be formed between the shield 162 and the light emitting component 161. An area of the light emergence part 1621 is larger than an area of the light emitting component 161, and the light emergence part 1621 includes a first surface 16211, a second surface 16212 opposite to the first surface 16211, and a plurality of slits S, where the slits S may be line-type slits or dot-shaped slits. Because the area of the light emergence part 1621 is larger than the area of the light emitting component 161, and because there is a gap between the shield 162 and the light emitting component 161, the formed gap can enable the second surface 16212 serving as an incident plane to completely receive the light ray L emitted from the light emitting component 161 when the light emitting component 161 emits a light ray L because of application of a current, the brightness of light emission of the light emitting module 16 can be effectively improved. On the other hand, the light emergence part 1621 including the plurality of slits S can be used as a diffraction grating. When the light ray L passes through the slits S of the light emergence part 1621, the light ray L begins to expand to two sides because of a diffraction effect. In this way, the light emitting module 16 can adjust the irradiation angle and improve the evenness of light emergence by means of the slits S, and an irradiation range of the light emitting module 16 is directed toward a position of the character symbol area 111 (as shown in FIG. 1).

Figure 3A:
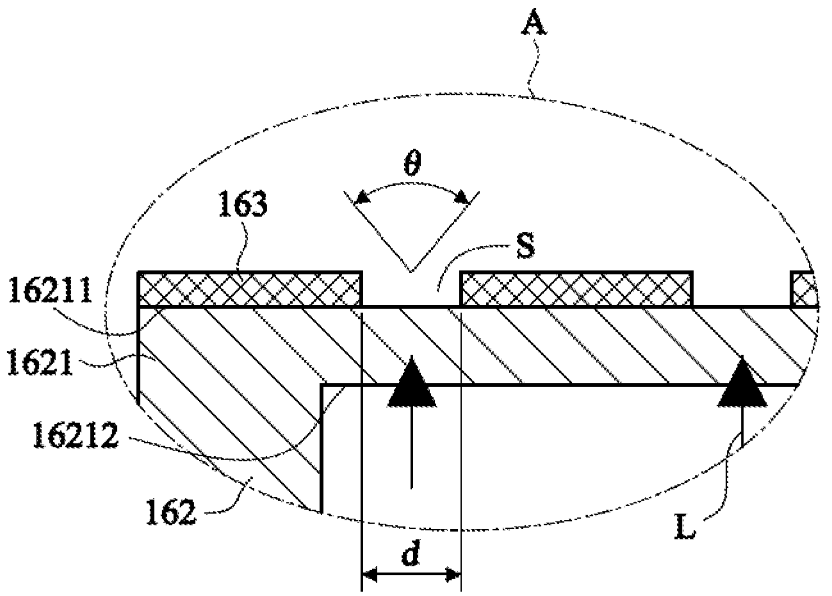
FIG. 3A is an enlarged view of a first embodiment of a slit structure in an area A in FIG. 2.

Still referring to FIG. 3A, FIG. 3A is an enlarged view of a first embodiment of a slit structure in an area A in FIG. 2. In this embodiment, the shield 162 is a transparent cover body, and is made of PET. In addition, because the shield 162 is a transparent cover body to be passed through by the light ray L, a tone of light emitted from the light emitting module 16 can be adjusted by adjusting a color of the shield 162. Subsequently, light-proof ink is coated on the first surface 16211 of the light emergence part 1621 by means of a spray coating or printing process, to form an ink layer 163 including a plurality of slits S. The ink layer 163 including the plurality of slits S can be used as a diffraction grating. When the light ray L passes through the slits S of the ink layer 163, a diffraction effect occurs and the light ray L begins to expand to two sides. In this way, the irradiation angle of the light emitting module 16 can be adjusted by means of the slits S formed on the ink layer 163, and the evenness of light emergence of the light emitting module 16 is improved at the same time. Smaller widths d of the formed slits S indicate a greater expansion angle θ of the light ray after the light ray L passes through the formed slits S. Although the present invention provides only the implementation that the ink layer 163 including the plurality of slits S is formed on the first surface 16211, during actual application, an ink layer including a plurality of slits may alternatively be formed on the second surface 16212 or an inner or outer surface of the sidewall part 1622, and is not limited to the implementations provided in the present invention.

Figure 3B:
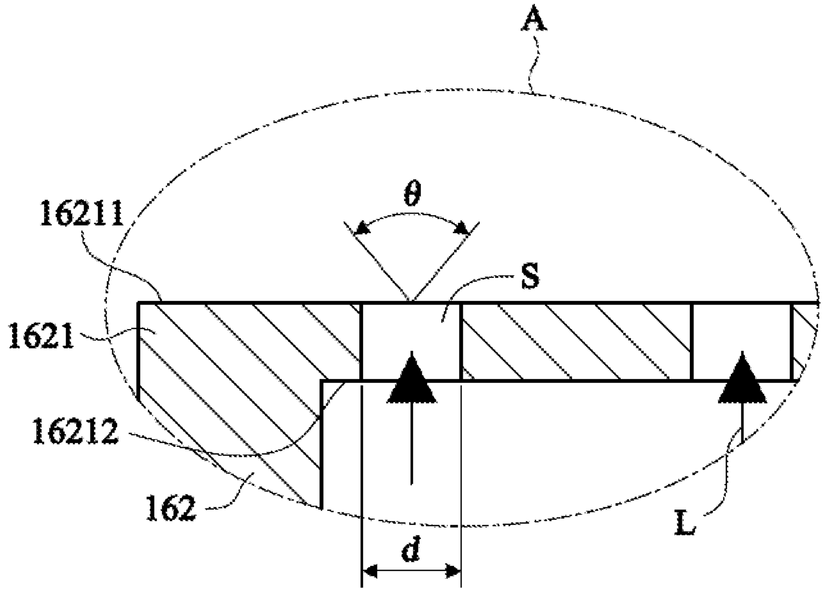
FIG. 3B is an enlarged view of a second embodiment of a slit structure in an area A in FIG. 2.

Still referring to FIG. 3B, FIG. 3B is an enlarged view of a second embodiment of a slit structure in an area A in FIG. 2. In this embodiment, the shield 162 is an opaque cover body, and is made of a reflector material. Subsequently, a plurality of slits S penetrating through the first surface 16211 and the second surface 16212 are formed in an area of the light emergence part 1621 by means of a punching process, and the light emergence part 1621 including the plurality of slits S can be used as a diffraction grating. When the light ray L passes through the slits S of the light emergence part 1621, a diffraction effect occurs and the light ray L begins to expand to two sides. In this way, the irradiation angle of the light emitting module 16 can be adjusted by means of the slits S penetrating through the first surface 16211 and the second surface 16212, and the evenness of light emergence of the light emitting module 16 is improved at the same time. Smaller widths d of the formed slits S indicate a greater expansion angle θ of the light ray after the light ray L passes through the formed slits S. Although the present invention provides only the implementation that the plurality of slits S penetrating through the first surface 16211 and the second surface 16212 is formed on the first surface 16211, during actual application, the plurality of slits S may alternatively be formed on the sidewall part 1622, and is not limited to the implementations provided in the present invention. On the other hand, although the present invention provides only the implementation that a single shield 162 is disposed on a single light emitting component 161, during actual application, a plurality of shield structures configured to cover a light emitting component may alternatively be formed in a Mylar sheet (not shown) on the thin film circuit board 14. In addition, a width of a slit of each shield may be adjusted according to a position of a character symbol area of each key cap, the irradiation angle of the light emitting module is adjusted by adjusting the width of the slit, to direct an irradiation range of the light emitting module toward the position of the character symbol area, so that the brightness and the evenness of light emission of the character symbol area of each key cap can be effectively improved.

Figure 4A:
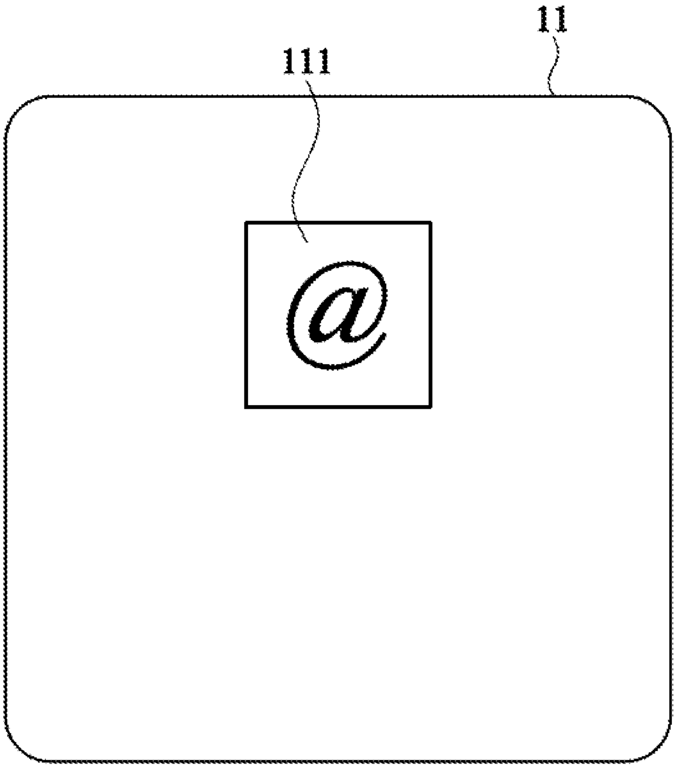
FIG. 4A and FIG. 4B are schematic diagrams of irradiation range adjustment of a light emitting module.
Figure 4B:
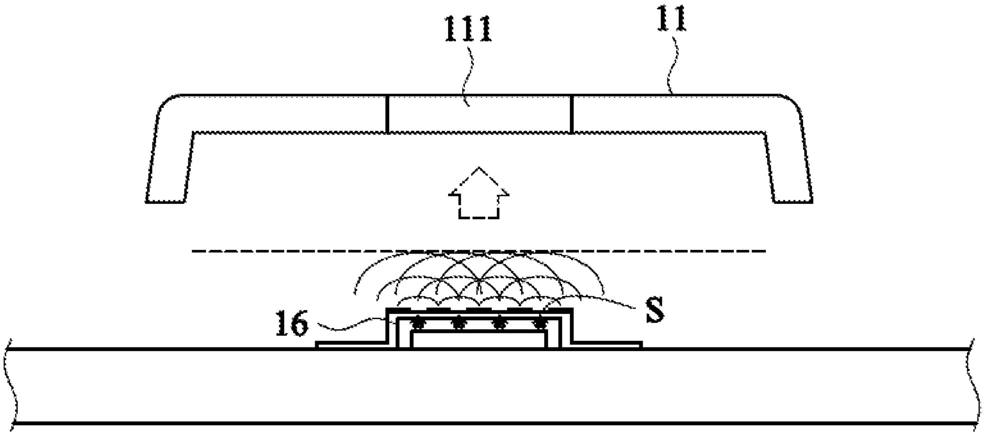

Referring to FIG. 4A, FIG. 4B, FIG. 5A, and FIG. 5B together, FIG. 4A, FIG. 4B, FIG. 5A, and FIG. 5B are schematic diagrams of irradiation range adjustment of a light emitting module. FIG. 4A is a top view of the key cap 11, where the character symbol area 111 is disposed at a position close to the center on the surface of the key cap 11, and the character symbol area 111 is made of a transparent material, so that a light ray emitted from the light emitting module 16 can pass through the surface of the character symbol area 111, to enable a user to recognize a character or a symbol on the key cap 11 such as a symbol "@" displayed in the character symbol area 111. Subsequently, refer to FIG. 4B. In FIG. 4B, the light emitting module 16 is disposed below the key cap 11. Because the character symbol area 111 is disposed at a position close to the center on the surface of the key cap 11, a light emitting module 16 with slits S having relatively large widths can be used, and an irradiation range of the light emitting module 16 is maintained to be toward the area above, so that the character symbol area 111 can receive irradiation of more light rays, thereby effectively improving the brightness of light emission of the character symbol area 111. On the other hand, after the light ray L passes the slits S and produces a diffraction effect, the light ray L generated by the light emitting component 161 (as shown in FIG. 2) is changed from a point light source form to a surface light source form, so that the evenness of light emission of the character symbol area 111 of the key cap 11 is effectively improved.

Figure 5A:
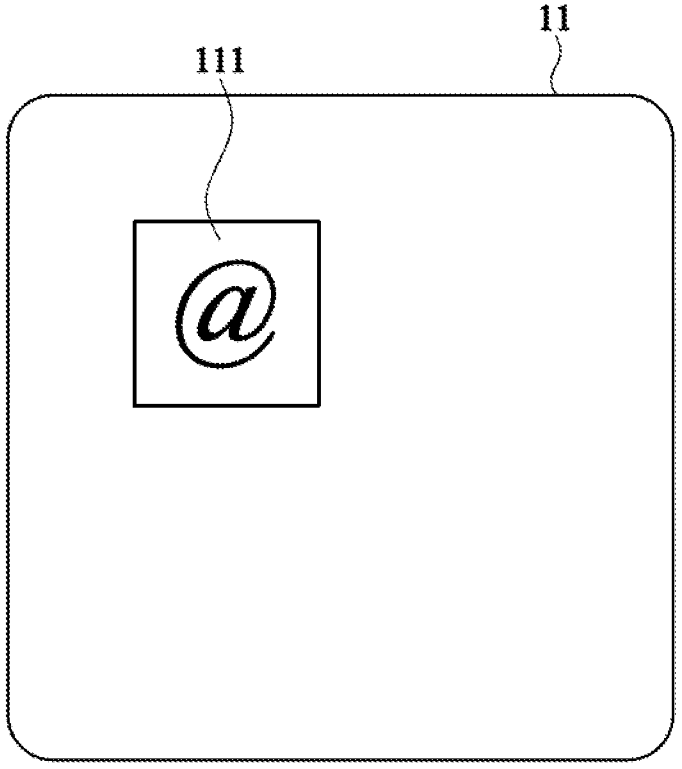
FIG. 5A and FIG. 5B are schematic diagrams of irradiation range adjustment of a light emitting module.
Figure 5B:
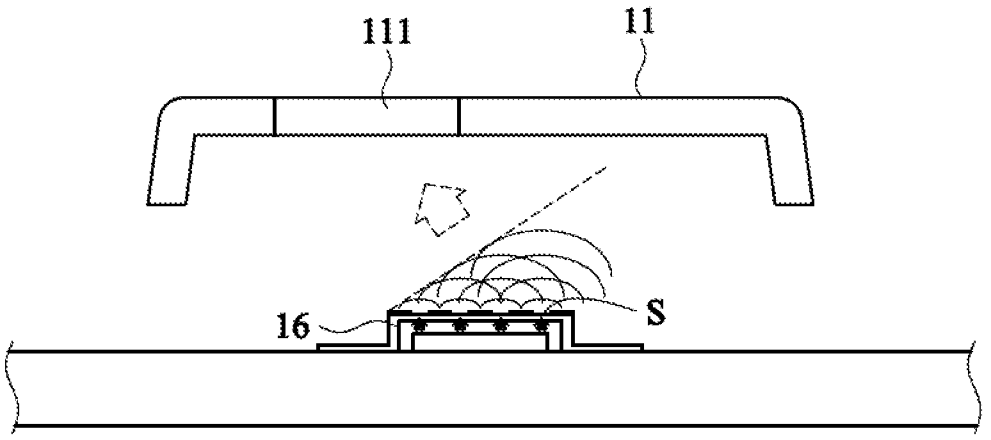

Still referring to FIG. 5A and FIG. 5B, FIG. 5A is a top view of the key cap 11, where the character symbol area 111 is disposed at a center-left position on the surface of the key cap 11, and the character symbol area 111 is made of a transparent material, so that a light ray emitted from the light emitting module 16 can pass through the surface of the character symbol area 111, to enable a user to recognize a character or a symbol on the key cap 11 such as a symbol "@" displayed in the character symbol area 111. Subsequently, referring to FIG. 5B, in FIG. 5B, the light emitting module 16 is disposed below the key cap 11. Because the character symbol area 111 is disposed at a center-left position on the surface of the key cap 11, a light emitting module 16 with slits S having relatively small widths can be used, and an irradiation range of the light emitting module 16 is maintained to be directed toward the area on the top left of the light emitting module 16, so that the character symbol area 111 at the center-left position on the key cap 11 can receive irradiation of more light rays, thereby effectively improving the brightness of light emission of the character symbol area 111. On the other hand, after the light ray L passes the slits S and produces a diffraction effect, the light ray L generated by the light emitting component 161 (as shown in FIG. 2) is changed from a point light source form to a surface light source form, so that the evenness of light emission of the character symbol area 111 of the key cap 11 is effectively improved.

Compared with the conventional technology, the luminous keyboard provided in the present invention includes a light emitting component that can improve the brightness of light emission of a light emitting module by using a configured shield. On the other hand, the irradiation angle of a light ray can be adjusted by means of slits on the shield, to direct an irradiation range of the light emitting module toward a position of a character symbol area of a key cap, so that the character symbol area can receive irradiation of more light rays, thereby effectively improving the brightness of light emission of the character symbol area. In addition, by means of the slits on the shield, light rays emitted from the light emitting component can be changed from a point light source form to a surface light source form, and the evenness of light emission of the light emitting module is improved at the same time, so that phenomena that the brightness of a surface of a key cap of a keyboard is even or bright spots are excessively concentrated can be effectively reduced. Therefore, the present invention is essentially of high industrial value.

Any modification to the present invention readily figured out by a person skilled in the art shall fall within the protection scope of the appended claims.

What is claimed is:

1. A luminous keyboard, comprising:

at least one key cap;

a support plate;

a support component, connected to the key cap and the support plate and capable of guiding the key cap to vertically move relative to the support plate;

a thin film circuit board, disposed on the support plate;

at least one light emitting component, configured to emit a light ray to the at least one key cap; and a shield, covering the at least one light emitting component, wherein there is a gap between the shield and the at least one light emitting component, and the shield is provided with a diffraction grating at a position where the light ray passes through the shield.

2. The luminous keyboard according to claim 1, wherein the shield comprises: a light emergence part, a sidewall part, a fixing part, and an accommodation space.

3. The luminous keyboard according to claim 2, wherein the light emergence part comprises a first surface and a second surface opposite to the first surface.

4. The luminous keyboard according to claim 3, wherein an ink layer is formed on the first surface or the second surface, and the ink layer comprises a plurality of slits to form the diffraction grating, and the diffraction grating is configured to adjust an irradiation range of the light ray.

5. The luminous keyboard according to claim 3, wherein the light emergence part comprises a plurality of slits, the slits run through the first surface and the second surface to form the diffraction grating, and the diffraction grating is configured to adjust an irradiation range of the light ray.

6. The luminous keyboard according to claim 2, wherein the fixing part is configured to fix the shield to the thin film circuit board.

7. The luminous keyboard according to claim 2, wherein the accommodation space is configured to accommodate the at least one light emitting component, and a volume of the accommodation space is larger than a volume of the at least one light emitting component, so that the gap is formed.

8. The luminous keyboard according to claim 1, wherein the light emitting component is a light emitting diode (LED) chip or an electro luminescence (EL) chip.

9. The luminous keyboard according to claim 1, wherein the shield is made of polyethylene terephthalate (PET) or a reflector material.

* * * * *